United States Patent Office 3,518,159
Patented June 30, 1970

3,518,159
METHOD OF MAKING A FAST-CURING ADHESIVE AND A METHOD OF BONDING MEMBERS UTILIZING SAID ADHESIVES
Harlan G. Freeman, Gene F. Baxter, and George Graham Allan, Seattle, Wash., assignors to Weyerhaeuser Company, Tacoma, Wash., a corporation of Washington
No Drawing. Filed May 18, 1967, Ser. No. 639,270
Int. Cl. B32b 27/08, 27/42; C08g 37/06
U.S. Cl. 161—258
18 Claims

ABSTRACT OF THE DISCLOSURE

A method of bonding a number of members together at ambient temperature utilizing fast bonding adhesives wherein separate adhesive compositions are spread on each of the surfaces to be bonded, the adhesive compositions capable of reacting with each other on contact to produce an infusible glue line without the application of external energy. To one surface is applied an adhesive composition containing a phenol-resorcinol-aldehyde condensation product and excess aldehyde, and to the second surface is applied an adhesive composition containing as one of its components a polyfunctional aromatic amine.

BACKGROUND OF THE INVENTION

As automated plants are being constructed to produce specialized engineered wood products, rapid-cure adhesives are becoming an even more important requirement. Phenolic adhesives containing dihydroxybenzene compounds such as resorcinol have met previous needs but are inadequate for present uses.

Separately-applied coacting resin adhesives and methods of using them are known. For example, see U.S. Pat. No. 2,557,826, wherein two resorcinol-formaldehyde or phenol-resorcinol formaldehyde adhesives, one of which is alkaline and the other neutral, are applied separately to the members to be bonded. When assembled they coreact to produce an infusible bond. The press times disclosed in U.S. Pat. No. 2,557,826 are at the minimum about 5 minutes at 75° F. The present invention which employs as one of the two basic materials an adhesive composition containing an aromatic amine compound, allows the use of press times of shorter duration at ambient temperature.

Heat hardenable resins made by condensing amino phenols with an aldehyde such as formaldehyde are known. For example, see U.S. Pat. Nos. 2,101,215 and 2,147,789. These resins are disclosed in the two above patents, however, are not suitable for the purposes herein defined.

The resin adhesive compositions of this invention are prepared separately. The first adhesive composition containing an excess of formaldehyde will cure in and of itself in time. The second adhesive composition containing the aromatic amine may have an aldehyde accelerator added and, if so, will also cure in time.

DETAILED DESCRIPTION OF THE INVENTION

Adhesives made by condensing a polyhydroxybenzene with an aldehyde are known. In particular, resorcinol formaldehyde resins have long been used for bonding materials such as wood. References may be had to U.S. Pats. Nos. 2,385,372, and 2,414,414, for methods of making and using resins containing as their essential ingredient a resorcinol-aldehyde component. Resorcinol-aldehyde resins are usually formed by reacting resorcinol with an aldehyde such as formaldehyde under suitable temperature conditions. Normally the aldehyde, such as formaldehyde or other aldehydes, is added in small amounts over a period of time in order to prevent a strong exothermic reaction. A catalyst, either acidic or alkaline, may be added toward the end of the reaction between resorcinol and formaldehyde to complete the reaction. The catalyst may be any of the conventionally used catalysts such as a mineral acid, organic acid, alkali, or alkaline base. Specifically such compounds such as sulfuric acid, hydrochloric acid, boric acid, acetic acid, citric acid, sodium hydroxide, potassium hydroxide, etc., may be used. Although resorcinol is preferred as the phenolic component of the first adhesive composition, other polyhydroxybenzenes may also be used, such as hydroquinone and catechol and trihydroxybenzene compounds such as phloroglucinol, pyrogallol, and 4-hydroxycatechol. The molar ratio of aldehyde to polyhydroxybenzene should be less than about 1 so that the resin will have a reasonable storage life. The particular pH of the resin composition is determinative of the pot life of the resin and can be adjusted to suit the particular need desired.

The first adhesive composition comprises in addition to the polyhydroxybenzene-aldehyde condensation product a monohydric phenol-aldehyde condensation product such as phenol-formaldehyde. By using 5 to 80 weight percent phenol-formaldehyde resin in addition to the highly reactive dihydroxy or trihydroxy-benzene component a substantial cost reduction can be achieved and, in some cases, better penetration control can be obtained by providing a bulkier resin molecule. A wide variety of phenol-formaldehyde resins can be employed. Resins of this type are standard commercial items. When using phenol-formaldehyde resin as the starting point for production of the first adhesive composition the free formaldehyde content at the time the polyhydroxybenzene compound such as resorcinol, phloroglucinol, etc., is added, should be less than about 1% to prevent a strong exothermic reaction. The preferred resin adhesive composition as manufactured should have a molar ratio of formaldehyde to total phenols (monohydric, dihydric, and trihydric), of less than about 1. The molar ratio of dihydroxy-benzene or trihydroxybenzene or combination to phenol, if phenol is used in the preparation of the first resin adhesive component, should be at least about 0.25.

The second resin adhesive component comprises as one of its components a polyfunctional aromatic amine having the formula

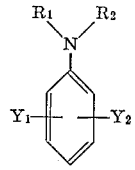

where $R_1$ and $R_2$ may be hydrogen; alkyl, e.g. methyl, ethyl, butyl, lauryl, or octadecyl; aryl, e.g. phenyl; $Y_1$ may be hydrogen, hydroxyl, alkyl, halogen, halogenated alkyl, alkoxy, aryloxy, nitro, or amine; and $Y_2$ may be hydroxyl, alkyl, aryl, halogen, halogenated alkyl, alkoxy, aryloxy, nitro, or amine. Specifically, aromatic amine compounds such as m-aminophenol, 2-aminoresorcinol, 2,4-diaminophenol, m-phenylenediamine, 1,2-diamino-4-nitrobenzene, 1,4-diamino-2-nitrobenzene, 1,3,5-benzenetriamine, N,N-diethyl-m-aminophenol 1,3-diamino-4-nitrobenzene, 3,5-dinitroaniline, 3,5-diaminophenol, 3,5-dihydroxyaniline and mixtures may be used. In addition to the amine compound, the second resin adhesive component may contain a phenol-formaldehyde resin or other conventional resin material. In formulating the second resin adhesive composition when a phenol-formaldehyde condensation product is used, the free formaldehyde content at the time the amino compound is added should be less than about 1% to prevent a strong exothermic reaction. In any case the resin as manufactured should have a formaldehyde to total phenols (monohydric-dihydric-trihydric) and aromatic amine molar ratio of less than 1 and the molar ratio of aromatic amine to phenol, if phenol is used in the formulation of the adhesive composition, should be at least about 0.25.

To the first resin adhesive composition is added sufficient aldehyde curing agent to cure the combined glue line. The aldehyde may be added as formaldehyde, paraformaldehyde, acetaldehyde, furfuraldehyde, or the butyl aldehydes. It is not necessary to add excess aldehyde to the second resin adhesive composition provided sufficient excess aldehyde curing agent is added to the first resin adhesive composition to give a total aldehyde to total phenols (monohydric-dihydric-trihydric) and aromatic amine molar ratio of at least 1 in the final combined glue line. If an excess of aldehyde curing agent is added to the second resin adhesive composition it should be an aldehyde of low reactivity or one which is chemically combined with another material to render the aldehyde not too readily available. Otherwise, the pot life of the resin composition is of short duration. Such aldehyde containing materials as the reaction product of an aldehyde and tris(hydroxymethyl) amino methane or other such similar materials may be used. In any case, the amount of aldehyde curing agent added to either the first or second resin adhesive compositions can be governed by the pot life desired. As was true with the first resin adhesive composition the pH of the second adhesive composition can be adjusted to give a pot life suitable for the processing desired.

It is to be understood that to each of the resin compositions can be added certain amounts of filler materials such as wood flour or walnut shell flour. In addition various solvents and wetting agents which are compatible with the resin compositions may be used in various quantities to improve the bonding properties with various types of materials. These solvents include such materials as methanol, methylethylketone, methylisobutylketone, acetone, or ethyl acetate.

In using the adhesives prepared according to the above description, the first and second resin adhesive compositions are applied in approximately equal quantities by weight to the respective surfaces of the members to be bonded. The quantity of adhesive used is depended upon the type of material being bonded. In laminating wood, for example, a total spread of from 35 to 60 lbs. per thousand square feet of surface is preferred.

After the first and second resin adhesive compositions have been applied to the surface of the members to be joined, the surfaces are brought together under pressure for a time sufficient for adequate bond strength to develop to hold the assembled article together. The pressure may vary from contact pressure to 250 p.s.i. When the two separate resin adhesive compositions are contacted with each other, reaction takes place which results in curing of the resin in a very short amount of time at ambient temperature. Press times, for example, as low as 120 seconds at room temperature (25° C.) have been used and excellent results obtained. The use of heat in the pressing operation is not precluded but it is not necessary and in fact constitutes one of the many advantages of this invention.

Although the method as described and the adhesives have their greatest use in the bonding of wood materials such as wood veneer and laminated wood products, various other materials may be bonded with these adhesives, for example, cloth, ceramics, leather, etc.

The following examples are given by way of illustration and are not intended to be limiting in any manner. All references are to parts by weight unless otherwise designated.

EXAMPLE I

A first resin adhesive composition was prepared by mixing 59.68 parts 91.2% phenol, 13.82 parts 97.3% paraformaldehyde flake, 0.81 part water and 0.58 part calcium acetate monohydrate together and heating to reflux (109° C.). Reflux conditions were maintained until the free formaldehyde content was reduced to 0.3% and then the charge cooled to room temperature. Resorcinol, 25.11 parts, was then added and heat applied to raise the temperature to reflux and refluxing was maintained for 2½ hours. The resin was then cooled to room temperature.

A second resin adhesive composition was prepared by mixing 58.28 parts 90.2% phenol, 13.35 parts 97.2% paraformaldehyde flake, 0.13 part water and 0.06 part calcium acetate monohydrate and heating from 23° C. to reflux (109° C.) in about 1 hour. Refluxing was maintained until the free formaldehyde content had been reduced to 0.4%. At a temperature of 90° C., 24.08 parts m-aminophenol was added and heat again applied to bring the charge to reflux. Immediately after reaching reflux, the batch was cooled to 80° C. and 4.10 parts 50% sodium hydroxide added. Heat was again applied to bring the mixture to reflux temperature (109° C.) and refluxing maintained for 5½ hours. The batch was then cooled to room temperature.

EXAMPLE II

The second adhesive composition of Example I, 84.0 parts, was mixed with 16 parts methanol and spread on one surface of a Douglas fir block. On the surface of a second Douglas fir block was spread 67.4 parts of the first adhesive composition of Example I mixed with 6.7 parts phloroglucinol and 25.9 parts of a 47.2% solution of formaldehyde in methanol. The spread surfaces were then joined. After 40 seconds of contact pressure, the laminate was pressed at 150 p.s.i. and 25° C. for 4 minutes. A tensile pull of 100 p.s.i. was immediately applied to the joint and was maintained for 24 hours. The joint withstood the stress and was finally broken by increasing the tensile load to 385 p.s.i.

EXAMPLE III

A first adhesive composition was prepared by mixing together 47.93 parts 97.5% phenol, 11.17 parts 97.0% paraformaldehyde flake, 0.75 part water and 0.47 part calcium acetate monohydrate. The mixture was heated to reflux (112° C.) in 1 hour and refluxing maintained for about 2 hours. The mixture was cooled and 20.23 parts m-aminophenol added and heat applied to raise the mixture to reflux for a brief time. The mixture was then cooled and 3.46 parts of a 49.4% aqueous solution of sodium hydroxide added and the mixture heated to reflux for 2½ hours. Again the mixture was cooled to room temperature and 15.99 parts methanol added during the cooling period.

A second adhesive composition was prepared by mixing together 62.7 parts 91.5% phenol, 11.75 parts 97.3% paraformaldehyde flake, 1.03 parts water and 0.62 part calcium acetate monohydrate. The mixture was heated to reflux (111° C.) in about 1 hour and refluxing maintained for approximately 2 hours. The charge was cooled and 20.64 parts resorcinol added. Heat was again applied to bring the mixture to reflux and reflux maintained for 1 hour. Again the charge was cooled to about 107° C. and 3.26 parts phloroglucinol added. Heat was again applied to produce refluxing and the batch held at reflux temperature for 1½ hours. The resin was then cooled to room temperature.

EXAMPLE IV

One surface of Douglas fir lumber was spread with the second adhesive compositions of Example III, 74.1 parts mixed with 25.9 parts of a 47.2% solution of formaldehyde in methanol. A first surface of Douglas fir lumber was spread with the second adhesive composition of Example III. The two surfaces of lumber were spread continuously and laminated in a continuous press. Spread weights were approximately 20 lbs. per thousand square feet of the first adhesive composition and 14 lbs. per thousand square feet of the second adhesive composition. The assembly time was 96 seconds and the press time was about 480 seconds. Shear testing of the laminates after maturity gave an average strength of 1449 p.s.i.

What is claimed is:

1. A method of bonding a plurality of member one to the other comprising:
   (a) applying to the surface of a first member a first adhesive composition containing a polyhydroxybenzene-aldehyde condensation product in which molar ratio of aldehyde to polyhydroxybenzene is less than about 1, and an additional amount of aldehyde sufficient to cure the first adhesive composition and assist in the curing of an interacting second adhesive composition,
   (b) applying to the surface of a second member a second adhesive composition comprising an hydroxybenzene-aldehyde condensation product containing as one of its components a polyfunctional aromatic amine having the formula

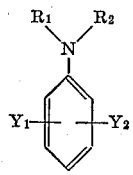

where $R_1$ and $R_2$ are radicals selected from the group consisting of hydrogen, alkyl, and aryl; $Y_1$ is a radical selected from the group consisting of hydrogen, hydroxyl, alkyl, aryl, halogen, halogenated alkyl, alkoxy, aryloxy, $NO_2$, and amine; $Y_2$ is a radical selected from the group consisting of hydroxyl, alkyl, aryl, halogen, halogenated alkyl, alkoxy, aryloxy, $NO_2$, and amine; and at least $Y_1$ or $Y_2$ is a radical selected from the group consisting of hydroxyl, amine, alkoxy, and $NO_2$, and
   (c) assembling together the first and second members so that the first and second adhesive compositions are brought into intimate reacting contact.

2. Method according to claim 1 wherein the first adhesive composition contains an additional phenol-aldehyde condensation product with the molar ratio of polyhydroxybenzene to phenol being at least 0.25.

3. Method according to claim 1 wherein the polyhydroxybenzene is one selected from the group consisting of resorcinol, phloroglucinol, pyrogallol, 4-hydroxycatechol, and mixtures.

4. Method according to claim 1 wherein the hydroxybenzenealdehyde condensation product of the second adhesive composition is a phenol-aldehyde condensation product, wherein the molar ratio of aldehyde to total phenol and amine is less than 1, and wherein the molar ratio of amine to phenol is at least 0.25.

5. Method according to claim 1 wherein the polyfunctional aromatic amine is one selected from the group consisting of m-aminophenol, 2-aminoresorcinol, 2,4-diaminophenol, m-phenylenediamine, 1,2-diamino-4-nitrobenzene, 1,4-diamino-2-nitrobenzene, 1,3,5-benzenetriamine, N,N-diethyl-m-aminophenol, 1,3-diamino-4-nitrobenzene, 3,5-dinitroaniline, and mixtures.

6. The method of producing a resin composition which comprises:
   (a) forming a first adhesive composition comprising a polyhydroxybenzene-aldehyde condensation product by reacting a polyhydroxybenzene with an aldehyde in the presence of a suitable condensation catalyst, the molar ratio of aldehyde to polyhydroxybenzene being less than 1, adding an additional amount of aldehyde sufficient to cure the first adhesive composition and assist in the curing of an interacting second adhesive composition,
   (b) forming a second adhesive composition comprising an hydroxybenzene aldehyde condensation product having as one of its constituents a polyfunctional aromatic amine of the formula

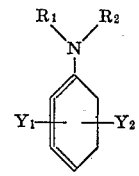

where $R_1$ and $R_2$ are radicals selected from the group consisting of hydrogen, alkyl, and aryl; $Y_1$ is a radical selected from the group consisting of hydrogen, hydroxyl, alkyl, aryl, halogen, halogenated alkyl, alkoxy, aryloxy, $NO_2$, and amine; $Y_2$ is a radical selected from the group consisting of hydroxyl, alkyl, aryl, halogen, halogenated alkyl, alkoxy, aryloxy, $NO_2$, and amine; and at least $Y_1$ or $Y_2$ is a radical selected from the group consisting of hydroxyl, amine, alkoxy and $NO_2$,
   (c) bringing the first and second adhesive compositions together resulting in reaction and interaction of the two adhesive compositions, and
   (d) curing the overall adhesive to an insoluble infusible state.

7. Method according to claim 6 wherein the first adhesive composition contains a phenol-aldehyde condensation product in which the molar ratio of polyhydroxybenzene to phenol is at least 0.25.

8. Method according to claim 6 wherein the polyhydroxybenzene is one selected from the group consisting of resorcinol, phloroglucinol, pyrogallol, 4-hydroxycatechol and mixtures.

9. Method according to claim 6 wherein the hydroxybenzenealdehyde condensation product of the second adhesive composition is a phenol-aldehyde condensation product, wherein the molar ratio of aldehyde to total phenol and amine compound is less than 1, and wherein the molar ratio of amine to phenol is at least 0.25.

10. Method according to claim 6 wherein the polyfunctional aromatic amine compound is one selected from the group consisting of a m-aminophenol, 2-aminoresorcinol, 2,4-diaminophenol, m-phenylenediamine, 1,2-diamino-4-nitrobenzene, 1,4-diamino-2-nitrobenzene, 1,3,5-benzenetriamine, N,N - diethyl-m-aminophenol, 1,3 - diamino-4-nitrobenzene, 3,5-dinitroaniline, and mixtures.

11. The method of producing a resin composition which comprises:
   (a) forming a first adhesive composition comprising a phenol-aldehyde condensation product having a free aldehyde content of less than about 1%, adding an amount of resorcinol sufficient to give a molar ratio of resorcinol to phenol of at least 0.25, adding an additional amount of aldehyde sufficient to cure the first adhesive composition and assist in the curing of an interacting second adhesive composition,
   (b) forming a second adhesive composition comprising a phenol-aldehyde condensation product having a free aldehyde content of less than about 1%, adding an amount of a polyfunctional aromatic amine sufficient to give a molar ratio of amine to total phenol of at least 0.25, said aromatic amine being substituted with a radical selected from the group consisting of hydroxyl, amine, alkoxy and $NO_2$,
   (c) bringing the first and second adhesive compositions together resulting in reaction and interaction of the two adhesive compositions, and (d) during the overall adhesive composition to an infusible insoluble state.

12. Method according to claim 11 wherein the molar ratio of total free aldehyde to phenol, polyhydroxybenzene, and polyfunctional aromatic amine, in the final combined adhesive composition is at least 1.

13. Method according to claim 11 where phloroglucinol is added to the first adhesive composition.

14. Method according to claim 11 wherein the aromatic amine is m-aminophenol.

15. Product of the process of claim 1.
16. Product of the process of claim 6.
17. Product of the process of claim 11.
18. Product of the process of claim 14.

References Cited
UNITED STATES PATENTS

| | | | |
|---|---|---|---|
| 2,432,544 | 12/1947 | Rhodes | 260—838 |
| 2,495,175 | 1/1950 | Nagel | 156—310 |
| 2,557,826 | 6/1951 | Keaton et al. | 260—838 |
| 2,557,922 | 6/1951 | Mazzucchelli et al. | 260—838 |

SAMUEL H. BLECH, Primary Examiner

J. C. BLEUTGE, Assistant Examiner

U.S. Cl. X.R.

156—310, 331, 335; 260—51.5, 838, 17.2, 17.3, 31.2, 32.8, 33.4; 161—262

PO-1050
(5/69)

UNITED STATES PATENT OFFICE
CERTIFICATE OF CORRECTION

Patent No. 3,518,159            Dated June 30, 1970

Inventor(s) HARLAN G. FREEMAN, ET AL

It is certified that error appears in the above-identified patent and that said Letters Patent are hereby corrected as shown below:

In column 4, line 75, "first" should read --second-- and in column 5, line 1, "second" should read --first--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents